US006307408B1

United States Patent
Shamlou et al.

(10) Patent No.: US 6,307,408 B1
(45) Date of Patent: Oct. 23, 2001

(54) METHOD AND APPARATUS FOR POWERING DOWN A LINE DRIVER

(75) Inventors: Daryash "Danny" Shamlou, Laguna Niguel; Wim F. Cops, Newport Beach; Cristiano Bazzani, Irvine, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/543,201

(22) Filed: Apr. 5, 2000

(51) Int. Cl.[7] .................................................. H03K 3/00
(52) U.S. Cl. .................................... 327/112; 326/58
(58) Field of Search ................................. 327/108, 111, 327/112, 198, 143, 544; 326/87, 56, 57, 58

(56) References Cited

U.S. PATENT DOCUMENTS

| 4,855,623 | * | 8/1989 | Flaherty | 326/58 |
| 4,961,010 | * | 10/1990 | Davis | 326/58 |
| 5,321,319 | * | 6/1994 | Mahmood | 326/57 |
| 5,367,645 | * | 11/1994 | Lubeck et al. | 326/58 |
| 5,434,519 | * | 7/1995 | Trinh et al. | 326/58 |
| 6,072,333 | * | 6/2000 | Tsukagoshi et al. | 326/87 |

* cited by examiner

Primary Examiner—Toan Tran
(74) Attorney, Agent, or Firm—Farjami & Farjami LLP

(57) ABSTRACT

Various exemplary aspects of the present invention provide methods and apparatus for powering down the line driver to a state that reduces power dissipation without affecting the overall impedance of the line driver. More particularly, a power down state for line drivers and the like is suitably provided that saves power when no transmission is required. The power down mode suitably provides line termination for received data. According to various aspects of an exemplary embodiment, output devices are configured at power down such that a low impedance is maintained.

17 Claims, 5 Drawing Sheets

METHOD AND APPARATUS FOR POWERING DOWN A LINE DRIVER

TECHNICAL FIELD

The present invention relates, generally, to methods and apparatus for creating a power down state in a circuit. More particularly, the present invention relates to a technique for powering down a line driver in a bidirectional transceiver while maintaining matched impedance without static power consumption.

BACKGROUND OF THE INVENTION

Communications devices such as modems, cable modems, digital subscriber line (DSL) modems and the like are becoming increasingly common. Such devices typically facilitate data communications between a source and a destination across a communications medium such as a telephone line, coaxial cable, twisted pair cabling, copper wires, fiber optics, radio frequency (RF), infrared or other wireless interface, or the like. Generally, such communications are bi-directional in that both source and destination are allowed to transmit and receive data over the same medium.

With reference to FIG. 1, a conventional communications system 100 includes a communications device 102 (such as a modem) that handles transmit data 112 and receive data 114 on a communications medium 104 (such as a telephone line). Typically, transmit data 112 is provided to the medium 104 via a line driver 150. Line driver 150 is commonly represented as an amplifier 106 and an output impedance $Z_{LD}$ (represented in FIG. 1 as resistor 108). Receive data 114 may be provided from medium 104 to communications device 102 via, for example, a separate data path 1 10 that bypasses amplifier 106.

Generally speaking, it is desirable to match the total output impedance of the line driver to the impedance of communications medium 104 (represented in FIG. 1 as $Z_{line}$). The total output of the impedance may be represented as the series of the line driver output impedance (which is usually quite low, such as on the order of a few milli-ohms) with line driver impedance $Z_{LD}$. Communications medium 104 typically exhibits a relatively low impedance (e.g. on the order of 100 ohms), so $Z_{LD}$ may be designed to be correspondingly low (e.g. on the order of 100 ohms, or as otherwise appropriate) when the line driver is activated. Failure to at least approximately match $Z_{LD}$ to $Z_{line}$ could result in undesirable reflections in medium 104, thus resulting in unwanted noise.

Further, it is generally desirable to conserve power in line driver 150 whenever possible. One technique for reducing overall power consumption involves powering down line driver 150 when device 102 is not transmitting on medium 104. For reasons that will become apparent, it has been generally difficult to power down line driver 150 without affecting impedance $Z_{LD}$. Hence, the driver impedance $Z_{LD}$ of many prior art systems did not adequately match the impedance $Z_{line}$ of communications medium 104 during power-down mode even if the impedance's properly matched when the line driver was powered up.

It is therefore desirable to create a line driver that provides adequate impedance matching with the communications line during all modes of operation while reducing overall power consumption.

BRIEF DESCRIPTION OF EXEMPLARY EMBODIMENTS

Various exemplary aspects of the present invention provide methods and apparatus for powering down the line driver to a state that reduces voltage drop without affecting the overall impedance of the line driver. More particularly, a power down state for line drivers and the like is suitably provided that saves power when no transmission is required. The power down mode suitably provides line termination for received data. According to various aspects of an exemplary embodiment, output devices are configured at power down such that a low impedance is maintained.

BRIEF DESCRIPTION OF THE DRAWING FIGURES

The above and other features and advantages of the present invention are hereinafter described in the following detailed description of exemplary embodiments to be read in conjunction with the accompanying drawing figures, wherein like reference numerals are used to identify the same or similar parts in the similar views, and:

DETAILED DESCRIPTION OF EXEMPLARY EMBODIMENTS

The present invention may be described herein in terms of functional block components and various processing steps. It should be appreciated that such functional blocks may be realized by any number of hardware and/or software components configured to perform the specified functions. For example, the present invention may employ various discrete or integrated circuit components, e.g., amplifiers, transistors, switches, digital or analog control devices and the like, which may carry out a variety of functions under the control of one or more microprocessors or other control devices. Further, it should be noted that the present invention may employ any number of conventional techniques for electronics configuration, signaling, data processing and the like.

It should be appreciated that the particular implementations shown and described herein are examples of the invention and are not intended to otherwise limit the scope of the present invention in any way. Indeed, for the sake of brevity, conventional electronics, semiconductor fabrication techniques and other functional aspects of the systems (and components of the individual operating elements of the systems) may not be described in detail herein. Furthermore, the connecting lines shown in the various figures contained herein are intended to represent exemplary functional relationships and/or physical or logical couplings between the various elements. It should be noted that many alternative or additional functional relationships, physical connections or logical connections may be present in a practical line driver circuit.

Although the methods and apparatus described herein are primarily expressed in terms of a line driver for a differential amplifier, the invention also encompasses many other applications. The invention could be used, for example, in conjunction with virtually any bi-directional communications circuit, amplifier circuit, or other analog or digital circuit. Similarly, the invention is primarily described as being implemented with field effect transistors (FETs), yet the invention is intended to apply to any type of circuitry including without limitation any sort of open or closed loop bipolar junction or field-effect transistors, or any sort of semiconductor technology. Moreover, the invention may be implemented in any manner, such as with discrete devices or in an integrated circuit fashion.

Figure 2:
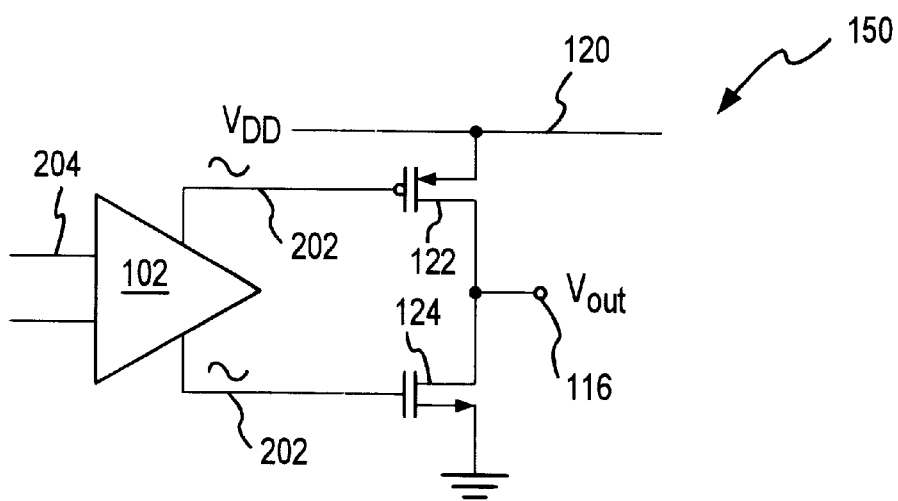
FIG. 2 is a circuit diagram of an exemplary line driver circuit.

According to various aspects of exemplary embodiments of the invention and with initial reference to FIG. 2, an exemplary line driver 150 suitably includes an amplifier 102, which may provide an output 202 to the gate terminals of a PFET 122 and an NFET 124. Amplifier 102 is shown in FIG. 2 as an operational amplifier, but any amplifier, transistor or combination of amplifiers/transistors could be used to implement amplifier 102.

As can be readily observed in FIG. 2, the source terminal of PFET 122 is connected to a voltage bias line 120, as appropriate. Voltage bias line may provide a relatively stable voltage source $V_{DD}$ of any magnitude, such as the 3 or 5 volt bias commonly associated with MOS devices or the 5 volt bias associated with transistor-transistor logic, or any other voltage magnitude. As the bias voltage signal 202 is provided to the gate of PFET 122, current suitably flows from the drain terminal of PFET 122 to the drain terminal of NFET 122. An output voltage 116 (also referred to as "$V_{out}$") is determined from the node connecting the drain terminal of PFET 122 to the drain terminal of NFET 124. The source terminal of NFET 124 is suitably grounded, as appropriate. Of course, the embodiment described herein and in FIG. 2 is a common representation of a traditional output stage of a differential amplifier as used in a line driver. It will be appreciated that various embodiments may appropriately modify the illustrated embodiment disclosed herein. For example, the output stages of practical line drivers may include various stages of transistors, or may include bipolar transistors in place of FETs.

During normal operation, amplifier 102 suitably receives an input signal 204 (which may represent a difference between two voltages applied at the input terminals of amplifier 102, for example). Amplifier 102 suitably amplifies input signal 204 to produce an output signal 202 that is provided to the gate terminals of transistors 122 and 124. Output signal 116 ($V_{out}$) is suitably produced by transistors 122 and 124 in response to amplifier output 202, as appropriate.

Figure 3:
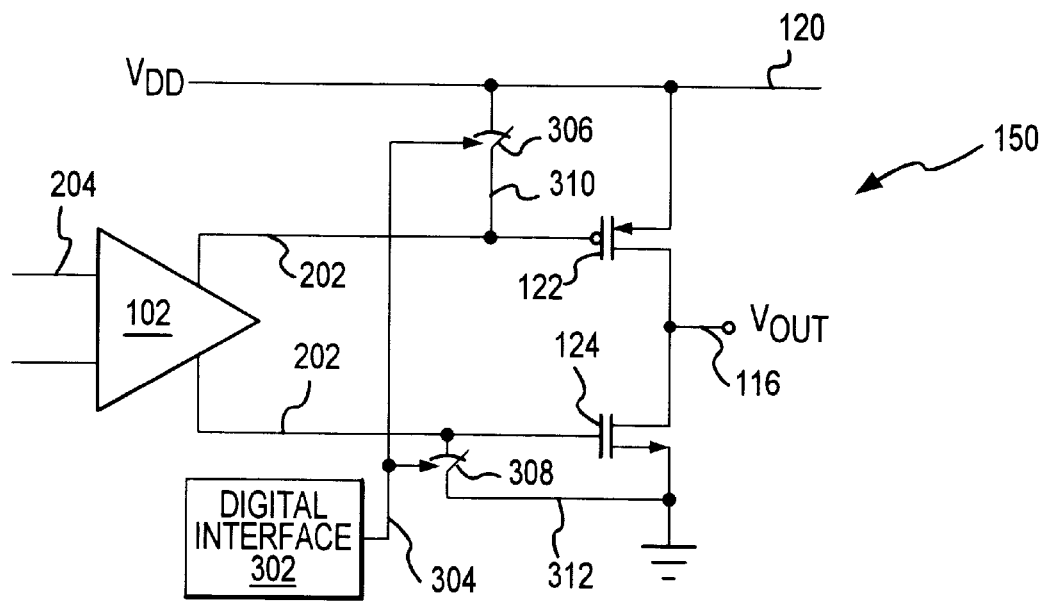
FIG. 3 is a circuit diagram of an exemplary line driver circuit with a power down mode.

With reference now to FIG. 3, one technique for powering down line driver 150 suitably involves turning off both transistors 122 and 124. To turn off PFET 122, the gate terminal is wired "high", for example by connecting the gate terminal to the bias voltage 120. Similarly, NFET 124 may be turned off by connecting the gate terminal to a "low" input, such as by grounding the terminal. One technique for accomplishing a power down according to this technique is to connect the gate terminal of PFET 122 to a bias voltage 120 through a connection 310 and switch 306. Similarly, the gate terminal of NFET 124 may be connected to ground though, for example, connection 312 and switch 308. Switches 306 and 308 suitably receive control signal 304 provided by a digital interface 302. Switches 306 and 308 may be any type of switch including any type of FET transistor, BJT transistor, electrical switch, relay or the like.

Control signal 304 may provide an indication of whether switches 306 and 308 should remain in an "open" state or a "closed" state, as appropriate. Digital interface 302 may provide access to any source such as a digital microcomputer, a microcontroller, a microprocessor, a digital signal processor or any other control device capable of generating control signal 304. Control signal 304 is suitably provided to switches 316 and/or 402 via a digital interface, as shown, or via any other connection to the controlling device. Although FIG. 3 shows a single control signal 304 provided to both switch 306 and 308, separate control signals for the various switches could be generated and provided to each switch independently.

Figure 1:
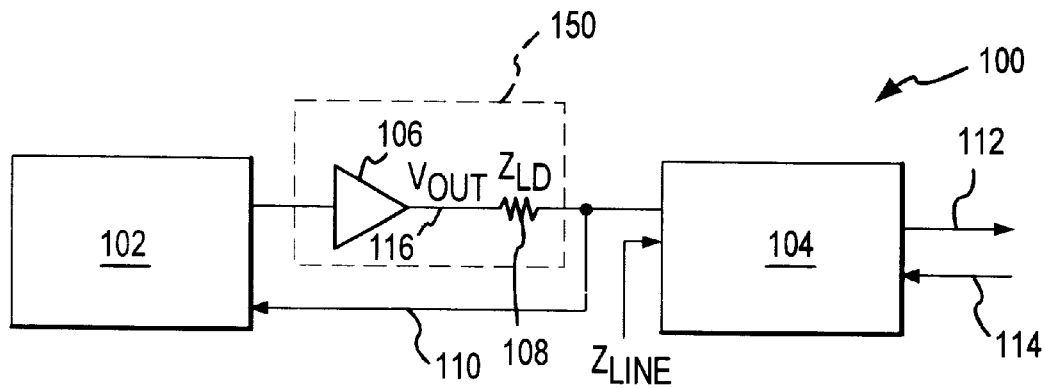
FIG. 1 is a block diagram of a prior art communications system.

During normal operation of line driver 150 (i.e., when communications device 102 is transmitting on communications medium 104 (see FIG. 1)), switches 306 and 308 may be in an "open" state to permit the normal flow of amplifier output signal 202 to PFET 122 and NFET 124, respectively. When line driver 150 is in a "power down" mode, digital interface 302 may provide a control signal 304 to close switches 306 and 308, thus turning off both transistors 122 and 124, respectively. A "power down" mode signal may be created by inverting an "enable" signal typically provided by digital interface 302, or through any other technique. It will be appreciated that when both transistors are turned off, power consumption is minimized but an open circuit condition exists between the source and drain terminals of both PFET 122 and NFET 124. The output impedance ($Z_{LD}$) observed across output terminal 116 ($V_{out}$), then, is undesirably high. Of course the output line 116 could also be connected to a low impedance source (such as ground), but such a connection may require additional large-capacity switching circuitry. Hence, the technique shown in FIG. 3 exhibits a significant disadvantage in that either the impedance of the line driver remains improperly matched to the impedance of the medium during power-down, or additional circuitry is required.

Figure 4:
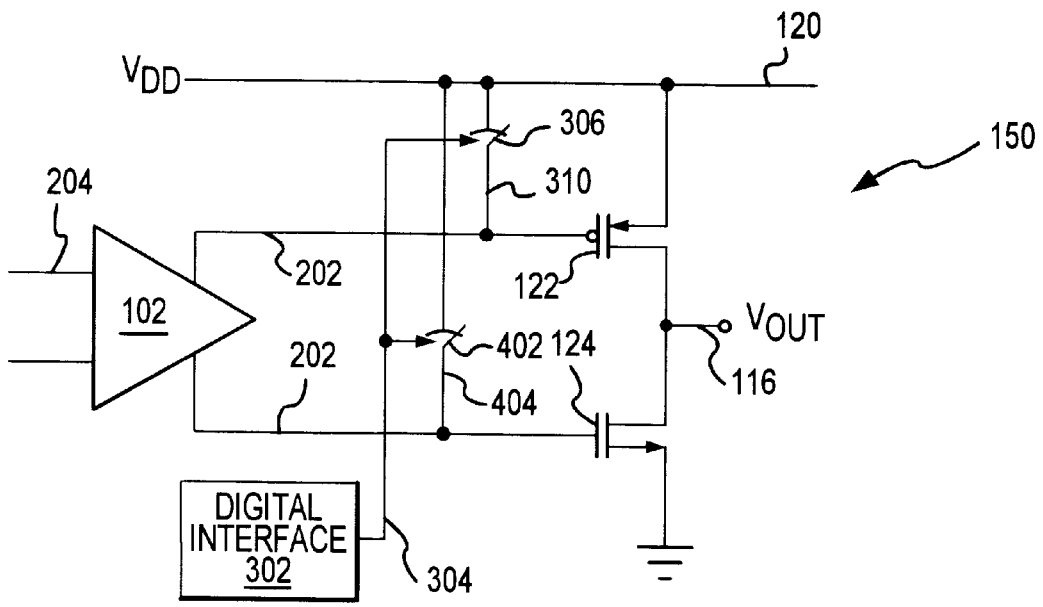
FIG. 4 is a circuit diagram of an exemplary line driver circuit with an improved power down mode.

An improved embodiment for powering down line driver 150 suitably involves switchably connecting the gate terminals of PFET 122 and NFET 124 to the bias voltage $V_{DD}$ 120 during power down mode such that PFET 122 is turned "off" but NFET 124 is driven "on". With reference now to FIG. 4, NFET 122 remains connected to bias voltage 120 through connection 310 and switch 306, as appropriate. JFET 122 may be connected to bias voltage 120 though connection 404 and switch 402, which suitably receives control signal 304. When power down mode is indicated by control signal 304, switches 306 and 402 may be closed such that PFET 122 is off and NFET 124 remains on. Such an arrangement suitably creates an open circuit between the source and drain terminals of PFET 122 such that output voltage 116 may be isolated from bias voltage 120. As NFET 124 is turned on, a short circuit condition is created between the source and drain terminals of the transistor, thus shorting the output voltage 116 to ground, a low impedance condition. When output voltage 116 is shorted to ground, no static power is dissipated by transistors 122 and 124, so power consumption is effectively reduced. Moreover, a low impedance condition on output line 116 may be created and maintained such that line driver impedance $Z_{LD}$ remains approximately matched to the line impedance $Z_{line}$, thus reducing noise and reflections in received signals.

Figure 5:
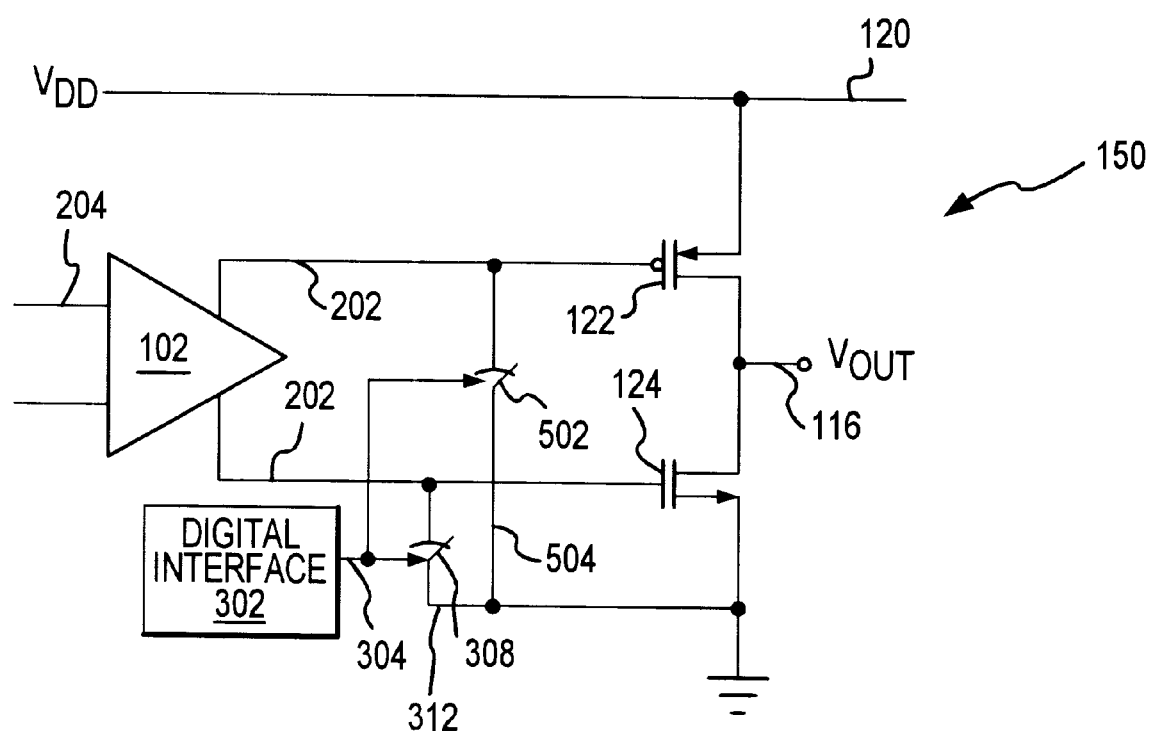
FIG. 5 is a circuit diagram of a second embodiment of an exemplary line driver with an improved power down mode.

An alternate embodiment of line driver 150 connects the gate terminals of PFET 122 and NFET 124 to ground during power off mode. With reference to FIG. 5, the gate terminal of NFET 124 remains connected to ground through connection 312 and switch 308 as described above in conjunction with FIG. 3. The gate terminal of PFET 122 may also be coupled to ground through a connection 312 and a switch 308. Switches 508 and 302 may be left open during normal operation to allow the flow of amplifier output signal 202 to the base terminals of PFET 122 and NFET 124. When "power down" mode is indicated by digital interface 302, control signal 304 may be provided to switches 508 and 302 to turn PFET 122 "on" and NFET 124 "off", respectively. As NFET 124 is turned off, an open circuit may be effectively created between the source and drain terminals of NFET 124, thus isolating output voltage 116 from ground. PFET 122 may be turned on, however, to create a short circuit to bias voltage 120, thus effectively tying the output voltage 116 to the bias voltage, again a low impedance condition. As with the previous embodiment, a low impedance power down condition is effectively created that reduces power consumption, since no static power is dissipated across PFET 122 or NFET 124 after the shutdown is complete. Hence a low impedance power down state may be created, as appropriate.

Figure 6B:
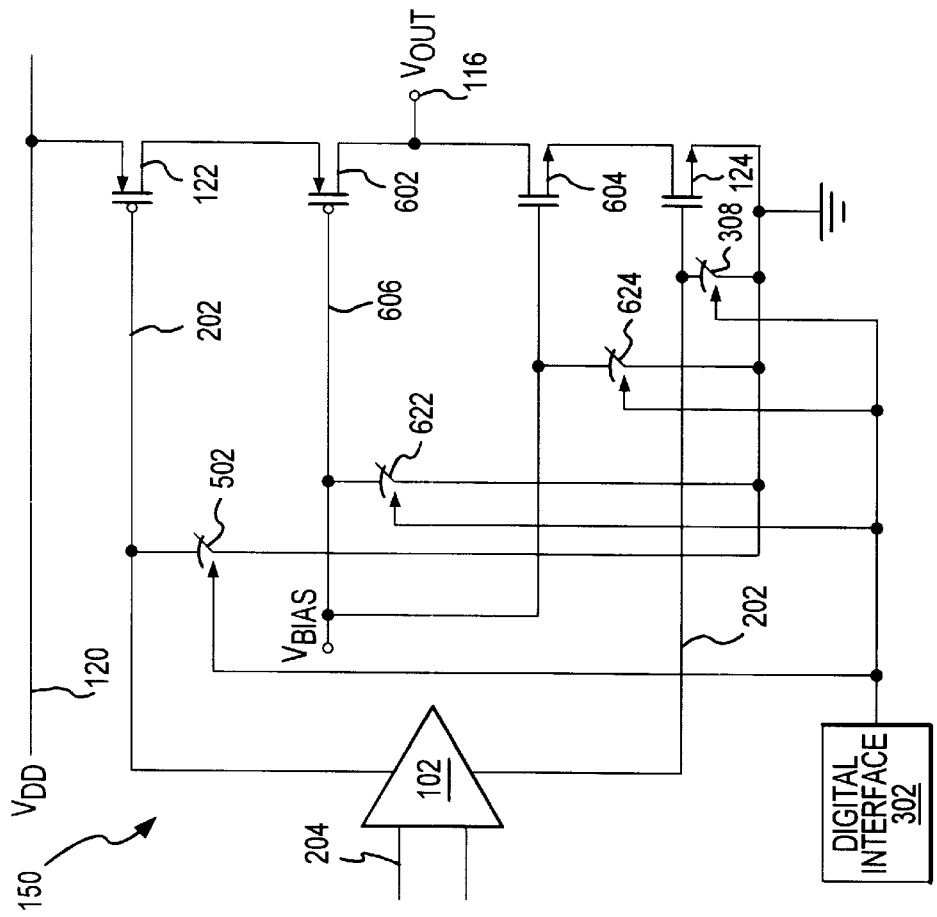
FIGS. 6A and 6B are circuit diagrams of exemplary line drivers configured in a cascade arrangement with an improved power down mode.
Figure 6A:
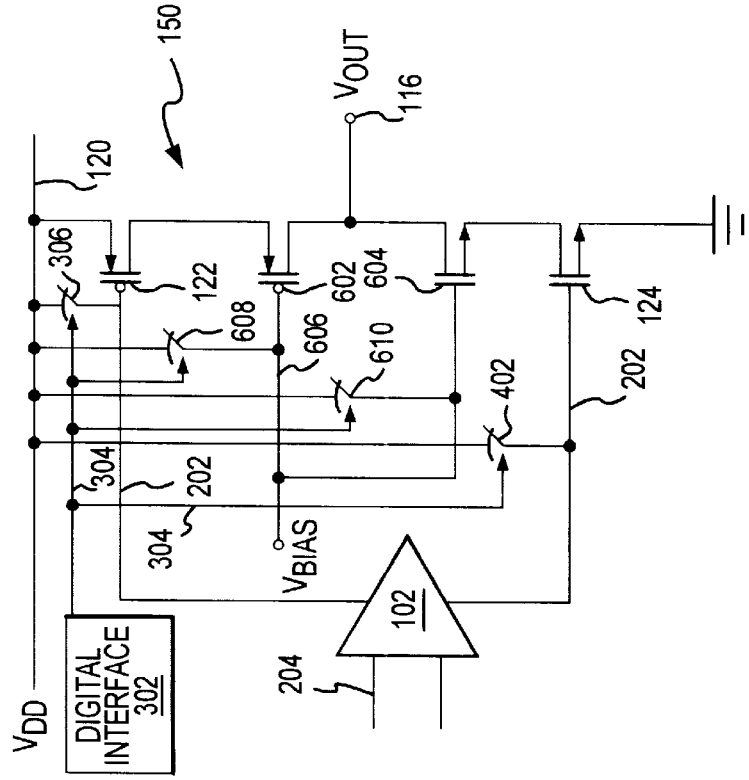

FIGS. 6A and 6B are circuit diagrams of exemplary line drivers configured in a cascade arrangement and having an improved power down mode. With reference to FIGS. 6A and 6B, a line driver 150 similar to that described above in conjunction with FIG. 4 may include additional cascade PFET 602 and cascade NFET 604 to increase the gain of line driver 150, or to otherwise enhance the performance of line driver 150. A bias signal ($V_{bias}$) 606 may be provided to the gate terminals of PFET 602 and NFET 604. In an exemplary embodiment, cascade transistors 602 and 604 may be powered down as appropriate by switchably connecting the base terminals of the four output transistors 122, 602, 604 and 124 to $V_{DD}$ (FIG. 6A) or ground (FIG. 6B). As shown in FIG. 6A, switches 306, 608, 610 and 402 may open or close the connections between $V_{DD}$ and the base terminals of transistors 122, 602, 604 or 124, respectively, in response to control signal 304 from digital interface 302. Similarly, switches 502, 622, 624 and 308 (FIG. 6B) may open and close the connections between ground and the base terminals of transistors 122, 602, 604 or 124, respectively. Of course other types of transistors (such as bipolar or P-channel devices) could be used in place of transistors 122, 602, 604 or 124.

Figure 8:
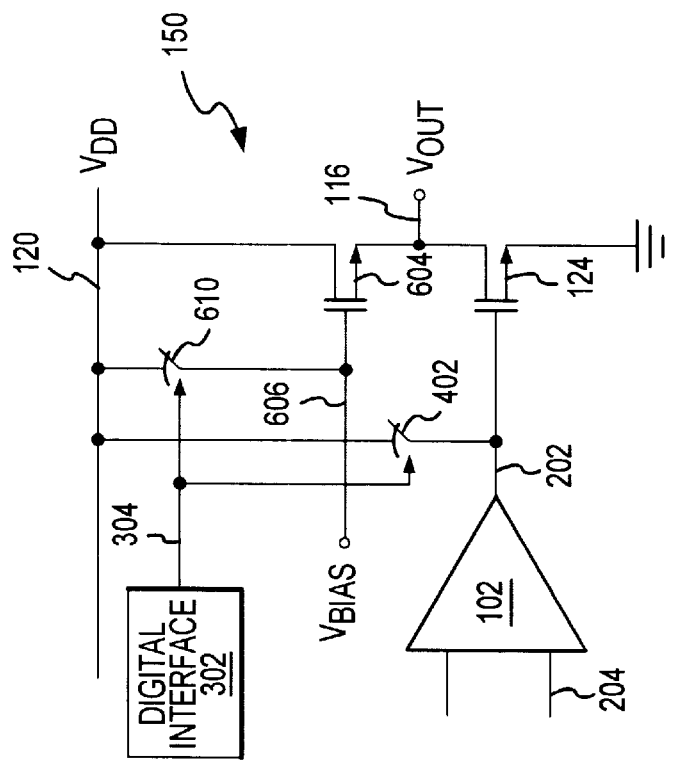
FIG. 8 is a circuit diagram of an exemplary line driver configured in a Class A manner with an improved power down mode.
Figure 7:
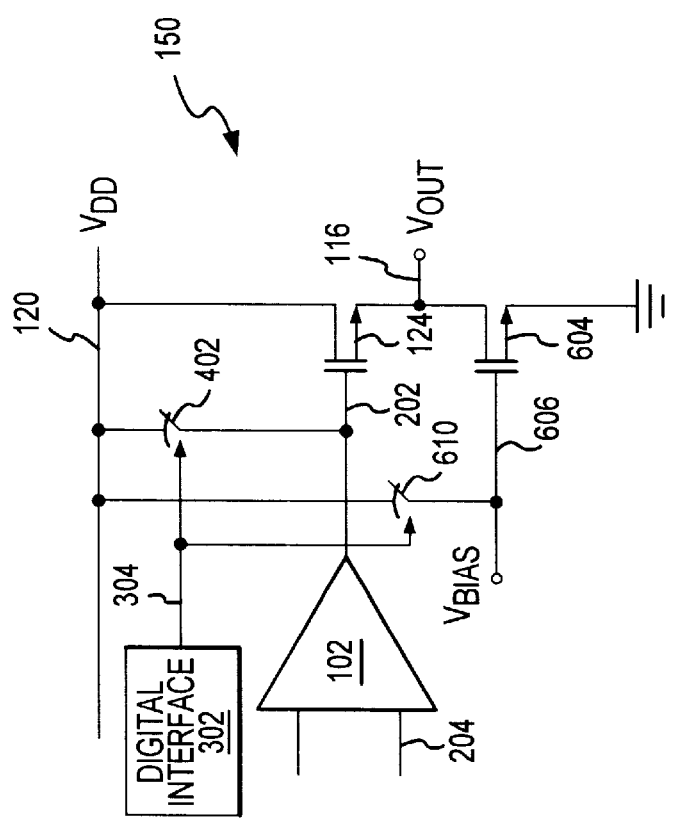
FIG. 7 is a circuit diagram of an exemplary line driver configured in a Class B manner with an improved power down mode.

FIGS. 7 and 8 are circuit diagrams of exemplary line drivers 150 configured as a "Class B" amplifier and as a "Class A" amplifier, respectively. With reference now to FIGS. 7 and 8, signal 202 from amplifier 102 may be provided directly to the gate terminal of NFET 124. Cascade NFET 604 may be coupled to the drain terminal of NFET 124 in the Class B amplifier shown in FIG. 7, for example, or cascade NFET 604 may be coupled to the source terminal of NFET 124 to create a Class A configuration, as shown in FIG. 8. In either case, line driver 150 may be powered down by switchably coupling the base terminals of NFETs 124 and 604 to voltage $V_{DD}$, as shown. As with the embodiments discussed above, switches 402 and 610 may be opened or closed, as appropriate, by a digital or other signal 304 from interface 302. Of course many types of class A, class B or class AB amplifiers could be formulated, all of which are within the ambit of the present invention. For example, the NFET transistors shown in FIGS. 7 and 8 could be replaced with PFET transistors, which could be switchably coupled to ground during power-down mode.

Although the subject application has been described herein with reference to the appended drawing figures, it will be appreciated that the scope of the invention is not so limited. Various modification in the design and implementation of various components and method steps discussed herein may be made without departing from the scope of the invention. For example, the line drivers having multiple stages with each stage having transistors tied high or low could be formulated. Similarly, various embodiments could be formulated with bipolar junction transistors, which may be connected to an intermediate voltage in place of bias voltage $V_{DD}$. Still further, the invention could be implemented not only in a line driver circuit, but also in any sort of circuit using impedance matching, particularly in conjunction with bi-directional communications. Moreover, it will be understood that many embodiments of the invention will be implemented in integrated circuit fashion rather than (or in combination with) discrete devices. The steps recited in any method claims may be practiced in any order, and are not limited to the order in which they are recited.

The invention is set forth in the appended claims.

What is claimed is:

1. A line driver for driving a communications medium, said line driver comprising:
   at least two output transistors;
   an amplifier configured to provide a output to at least one of said at least two output transistors; and
   at least two switches, each of said at least two switches being coupled to one of said at least two output transistors, wherein said at least two switches are operable to place said line driver into a power-down mode wherein at least one of said at least two output transistors is turned off and wherein another of said at least two transistors is turning on without substantially altering the output impedance of said line driver.

2. The line driver of claim one wherein said at least two switches are configured to receive a control signal from an interface.

3. The line driver of claim 2 wherein each of said at least two switches are operable to couple one of said at least two output transistors to a reference voltage.

4. The line driver of claim 3 wherein at least one of said at least two output transistors is turned off when said line driver is in said power-down mode.

5. The line driver of claim 4 wherein at least one of said at least two output transistors is turned on when said line driver is in said power-down mode.

6. The line driver of claim 3 wherein said at least two output transistors comprise a PFET and an NFET.

7. The line driver of claim 6 wherein the gate terminals of said PFET and said NFET are coupled via said at least two switches to said reference voltage.

8. The line driver of claim 7 wherein said reference voltage is a bias voltage.

9. The line driver of claim 7 wherein said reference voltage is ground.

10. A method of powering down a line driver, the method comprising the steps of:
   providing said line driver, said line driver comprising at least two output transistors;

coupling each of said at least two output transistors to a reference voltage via at least two switches, each of said at least two switches being associated with one of said at least two output transistors; and providing a control signal to each of said at least two switches such that said reference voltage is provided to each of said at least two output transistors such that one of said at least two output transistors is turned on and another of said at least two output transistors is turned off when said line driver is in a power-down mode.

11. The method of claim 10 wherein the output impedance of said line driver is not substantially altered by placing said line driver into said power-down mode.

12. The line driver of claim 11 wherein at least one of said at least two output transistors is turned off when said line driver is in said power-down mode.

13. The line driver of claim 12 wherein at least one of said at least two output transistors is turned on when said line driver is in said power-down mode.

14. The line driver of claim 11 wherein said at least two output transistors comprise a PFET and an NFET.

15. The line driver of claim 14 wherein the gate terminals of said PFET and said NFET are coupled via said at least two switches to said reference voltage.

16. The line driver of claim 15 wherein said reference voltage is a bias voltage.

17. The line driver of claim 15 wherein said reference voltage is ground.

* * * * *